United States Patent
Stilburn

[11] Patent Number: 6,066,401
[45] Date of Patent: May 23, 2000

[54] WIDE-BAND TWO-LAYER ANTIREFLECTION COATING FOR OPTICAL SURFACES

[75] Inventor: James Stilburn, Victoria, Canada

[73] Assignee: National Research Council of Canada

[21] Appl. No.: 09/030,395

[22] Filed: Feb. 25, 1998

[51] Int. Cl.[7] ................................... B32B 15/00
[52] U.S. Cl. ................... 428/432; 428/689; 428/701; 428/702; 428/212; 428/699; 428/692; 359/359; 359/580; 359/586; 359/589
[58] Field of Search ................... 428/689, 702, 428/212, 701, 699, 432, 692; 359/359, 580, 586, 589

[56] References Cited

U.S. PATENT DOCUMENTS

| | | | |
|---|---|---|---|
| 3,679,291 | 7/1972 | Apfel et al. | 350/164 |
| 3,761,160 | 9/1973 | Apfel et al. | 350/164 |
| 5,494,743 | 2/1996 | Woodard et al. | 428/336 |
| 5,783,049 | 7/1998 | Bright et al. | 204/192.14 |
| 5,851,674 | 12/1998 | Pellerite et al. | 428/421 |

*Primary Examiner*—Deborah Jones
*Assistant Examiner*—Jason Resnick
*Attorney, Agent, or Firm*—Julius Szereszewski

[57] ABSTRACT

A process for forming a two-layer coating on glass or another substrate involves applying first a layer of light metal fluoride on the substrate and subsequently a layer of a porous metal oxide e.g. silica. The metal fluoride layer may be applied by using the sol-gel technique or by other methods e.g. vacuum deposition. The metal oxide layer is preferably applied by a sol-gel technique, by either a dip coating or spin coating. Each layer is preferably about one quarter-wavelength thick. The refractive index of the first layer is lower than that of the substrate, and the second layer has lower refractive index than the first layer. This dependence minimizes reflection of the coating over a broad wavelength range.

7 Claims, 2 Drawing Sheets

WIDE-BAND TWO-LAYER ANTIREFLECTION COATING FOR OPTICAL SURFACES

FIELD OF THE INVENTION

This invention relates to broadband antireflective coatings applied to the surface of optical elements such as lenses or CRT (cathode ray tube) display panels.

BACKGROUND OF THE INVENTION

It is desirable to reduce as much as possible the amount of light reflected at the air-glass interface of an optical element e.g. an optical lens, to increase the light throughput and, in some instances, to minimize ghost images. In some applications, the coating must perform over a wide wavelength range.

Several types of antireflective coatings are known already. U.S. Pat. No. 5,572,086 to Tong et al. proposes an antireflective and antistatic coating for a CRT display panel. The multi-layer coating comprises a first conductive grounded inner coating including a metal salt such as antimony-tin oxide, and an outer coating disposed on the first coating and comprising a water soluble organic or inorganic salt or a polymer soluble in an organic solvent. The outer coating has a plurality of pores of various depths for providing the outer coating with a range of light refractive indexes determined by the depth of the pores.

Boulos et al, U.S. Pat. No. 5,208,181 proposes an antireflective coating having a metal oxide and a graded concentration of light metal fluoride. The process for forming the coatings is also described in Boulos et al, U.S. Pat. No. 5,268,196.

Both these patents describe an approach in which the fluorination of the fluoride layer is controlled such that the concentration of the fluoride varies across the thickness of the fluoride layer.

There is still a need for efficient, durable, easily-applied and relatively inexpensive antireflective (AR) coatings having a passband from about 360 to about 1400 nanometers.

SUMMARY OF THE INVENTION

In accordance with the invention, there is provided an antireflective coating on the surface of a substrate. The coating comprises:

a layer of a light metal fluoride applied on the surface of the substrate, and a layer of porous metal oxide applied over the metal fluoride layer.

Preferably, the optical thickness of each layer is about one quarter wavelength at the wavelength where a reflection minimum is desired.

The substrate may be glass, plastic or a crystalline material.

The light metal is at least one metal selected from the group consisting of magnesium, lithium, sodium, potassium, calcium, strontium or barium.

The metal oxide is one or more of the oxides of silicon, aluminum and titanium. Preferably, the metal oxide is silica.

The process of forming the antireflective coatings of the invention comprises the steps of:

applying a coating of a light metal fluoride on the surface of a substrate, applying a porous metal oxide coating over the light metal fluoride coating.

Preferably, the porous metal oxide layer is applied by a sol-gel technique.

The light metal fluoride may be applied by vacuum deposition. Alternatively, it may be applied by fluorination of a metal oxide layer deposited by a sol-gel technique.

Following the above steps, the total coating may be hardened by any suitable method e.g. by treatment with gaseous ammonia or ammonium hydroxide vapor.

Optionally, the total two-layer coating may be rendered hydrophobic e.g. by treating it with a silane compound.

DETAILED DESCRIPTION OF THE INVENTION

The invention provides a two-layer anti-reflective coating on a substrate such as glass, plastic or a crystalline material. The first layer, in direct contact with the substrate, is a light metal fluoride layer that may be applied by a well-known vacuum deposition technique or by a sol-gel technique. The second layer is a porous oxide layer, e.g. a silica layer, that is preferably applied with a sol-gel technique, also commonly known in the art.

According to the invention, the concentration of fluoride is substantially constant throughout the fluoride layer. To this effect, where sol-gel and subsequent fluorination is chosen as the method of applying the light metal fluoride, the fluorination is continued for a period of time sufficient to substantially completely fluorinate the light metal which has been applied by the sol-gel technique.

The vacuum deposition method is preferred where it is desired to achieve the refractive index of the bulk metal fluoride in the layer. The sol-gel technique combined with fluorination produces a layer of higher index which is preferred for substrates having a refractive index higher than 1.5.

The second layer is preferably applied using a sol-gel technique to produce a porous metal oxide layer, preferably silica ($SiO_2$). The porosity of the layer causes the refractive index of that layer to be approximately an average of the index of the bulk material and air.

It is the stepped decrease in refractive index occurring between the substrate and the second (metal oxide) layer that results in the enhanced broad-band performance of the coating of the invention.

Each of the two layers has a thickness of approximately one quarter-wavelength at the wavelength where a reflection minimum is desired. However, the thickness of the layers can be changed and the refractive indexes can be varied over a small range to minimize the reflectivity at a chosen wavelength and to maximize the bandwidth.

Figure 2:
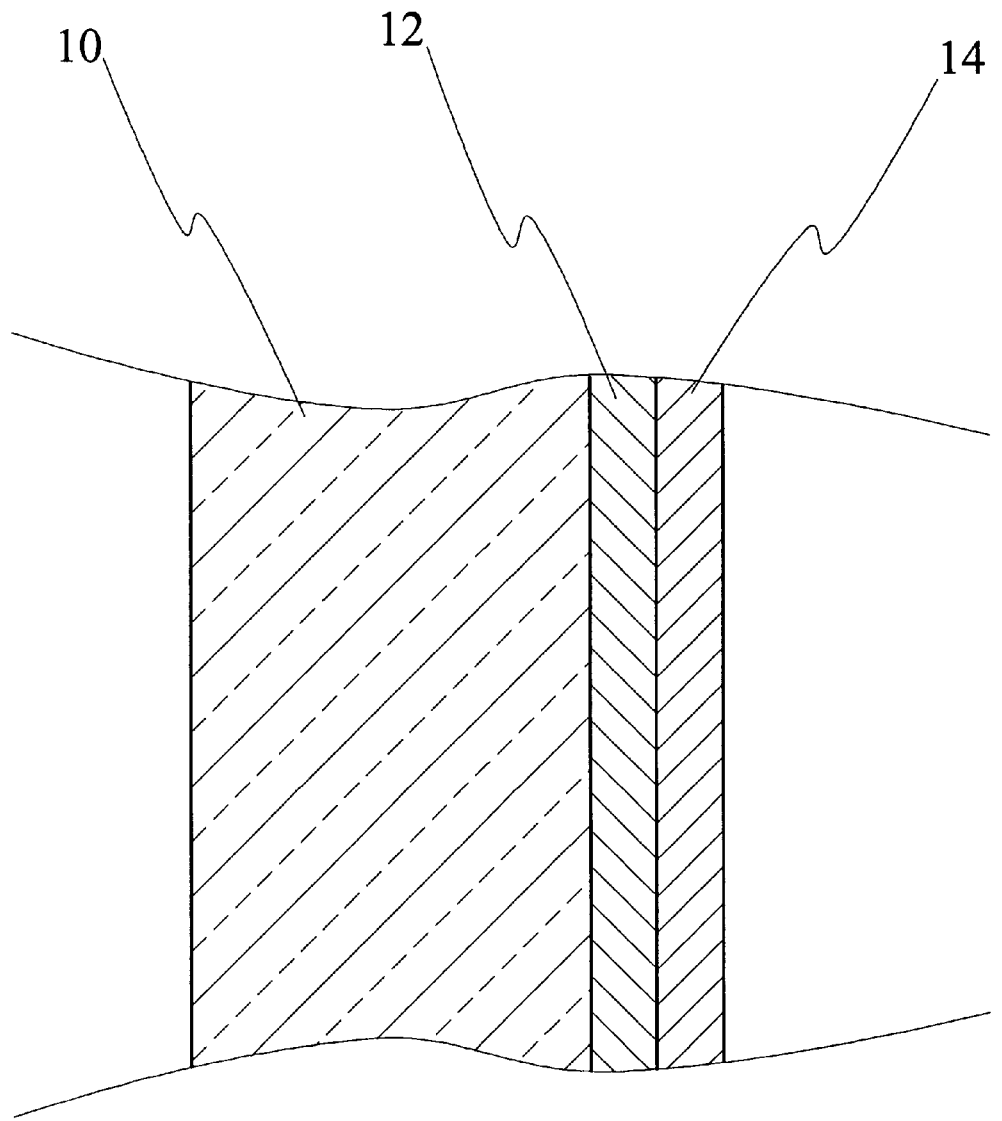
FIG. 2 is a partial sectional view of a coating of the invention applied on the outer surface of an optical element.

In a specific example, the antireflection coating was applied to an optical element working in the visible and near-infrared range from 400 to 1400 nanometers. As seen in FIG. 2, the substrate 10 was Schott BK7 optical glass having a refractive index of about 1.5.

The first layer 12 was $MgF_2$ applied by vacuum deposition in a known manner. The thickness of the layer was one quarter-wavelength at 600 nm. The layer had a very low porosity and a refractive index near that of the bulk magnesium fluoride. It is known that the refractive index of bulk magnesium fluoride is 1.38 (Modern Optical Engineering, McGraw-Hill 1966, page 170).

For the second layer 14, a sol-gel solution was prepared from the following ingredients (in weight percent):

| | |
|---|---|
| Anhydrous ethyl alcohol | 93.2% |
| Tetra-ethyl orthosilicate (TEOS) | 5.2% |
| Ammonium hydroxide (50%) | 1.6% |

The TEOS was stirred into the alcohol and ammonium hydroxide was added. The mixture was allowed to stand in a closed container at room temperature for three days to allow the growth of silica spheres, about 20 nm in diameter, which formed a suspension in the alcohol. The proportions given here produced a silica concentration of 1.5 % which can be decreased by dilution with ethyl alcohol to control the thickness of the coating. In the present example, the silica concentration was reduced to 0.85 %. The coating was applied by spinning the substrate at 250 RPM on a horizontal turntable, and pouring the sol-gel solution onto the center of the substrate. The solution was poured at a rate of 1 or 2 millilitres per second until the entire surface had been wetted and liquid was being flung from the edge. The turntable was allowed to spin for another 2 minutes to dry the coating. Because the coating was porous, the refractive index was less than that of the bulk silica. In the present example, the index was about 1.22.

The second, external layer 14 of the two-layer coating of the invention is typically very fragile and is easily damaged by wiping. The layer was hardened by enclosing the glass in an airtight container with an open vessel containing 50% ammonium hydroxide. The duration of the exposure to ammonia vapor was 24 hours. This step improved the hardness and durability of the coating to the point where the coating was tolerant of mild wiping and cleaning with solvents.

The hardening also caused some shrinkage of the sol-gel layer, resulting in a decrease in the wavelength of minimum reflectivity of about 7%. This should be taken into account when the solution concentration is chosen.

It is known that porous silica is hygroscopic and will absorb water if placed in a humid atmosphere for an extended time. The air volume in the porous layer will eventually be displaced by water, causing the index of the layer to rise. As a result, the reflection characteristics of the coating are degraded. It is therefore preferred that the silica layer be made hydrophobic. In the specific example, the coating was immersed for a few minutes in a solution of 5 ppm of dichlorodimethylsilane in anhydrous ethyl alcohol. The substrate was then dried while standing on edge to allow the solution to run off. The treated coating did not show any degradation of antireflection properties after immersion in water or long-term exposure to a humid environment.

Figure 1:
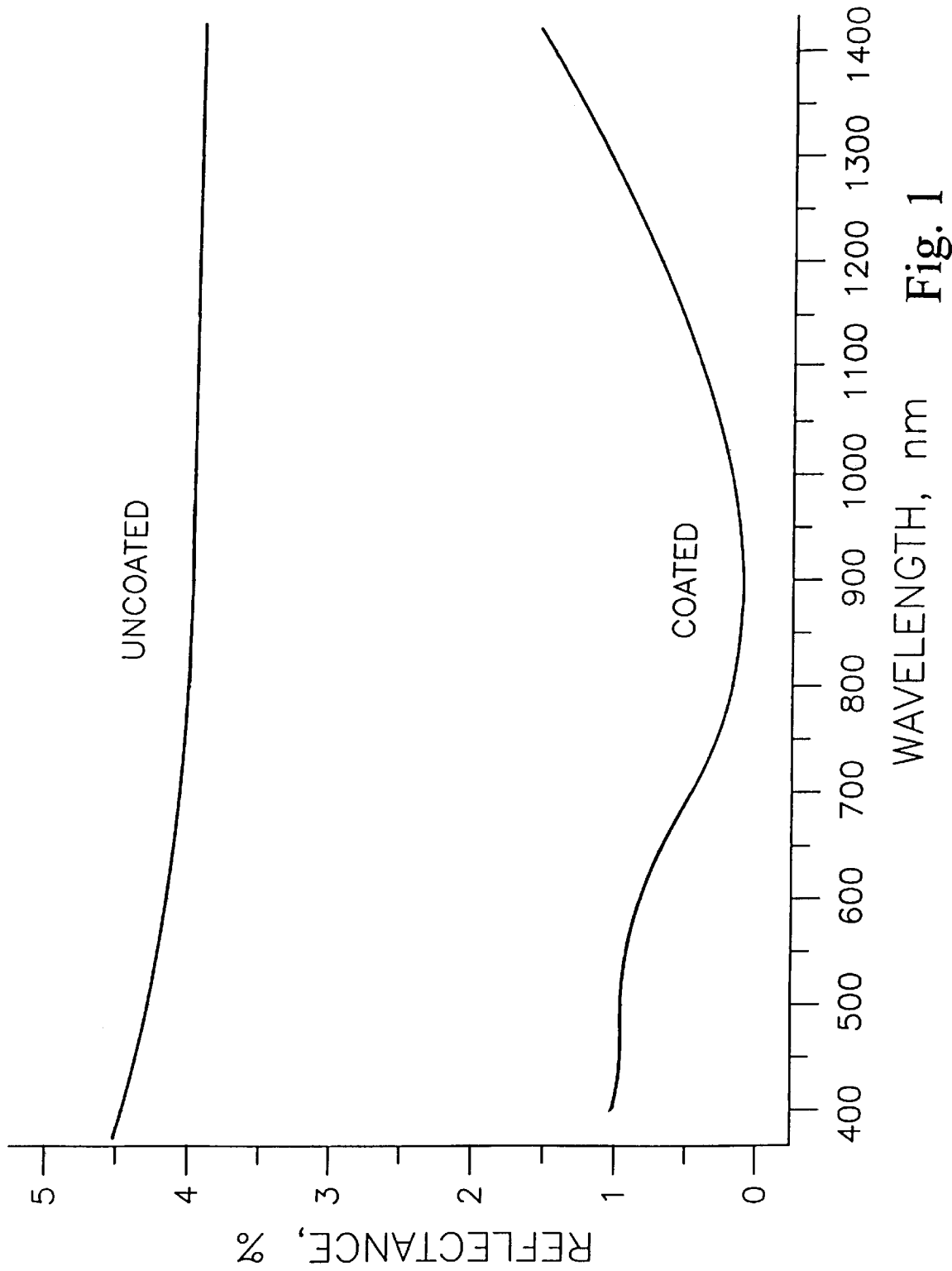
FIG. 1 is a graph showing the reflectivity vs. wavelength of an exemplary coating of the invention compared to the reflectivity of uncoated Schott BK7 glass.

The reflectance of the coating 12, 14 obtained in the above example compares favourably, as shown in FIG. 1, with that of uncoated Schott BK7 optical glass over a range from 400 to 1400 nanometers.

What is claimed is:

1. A two-layer antireflective coating on a substrate, comprising:

a first layer of a light metal fluoride applied on the surface of the substrate, and a second layer of a porous metal oxide applied over the metal fluoride layer, the refractive index of said coating being substantially uniform throughout each of said layers and decreasing from said metal fluoride layer to said metal oxide layer.

2. The coating according to claim 1 wherein the refractive index of said first layer is lower than the refractive index of said substrate.

3. The coating according to claim 1 wherein the thickness of said first layer and said second layer is about one quarter-wavelength at a wavelength where a reflection minimum is desired.

4. The coating according to claim 1 wherein said substrate is selected from the group consisting of glass, plastic and a crystalline material.

5. The coating according to claim 1 wherein said light metal fluoride is selected from the group consisting of magnesium fluoride, lithium fluoride, sodium fluoride, potassium fluoride, calcium fluoride, strontium fluoride or barium fluoride.

6. The coating according to claim 1 wherein said metal oxide is one or more of the oxides of silicon, aluminum and titanium.

7. The coating according to claim 6 wherein the metal oxide is silica.

* * * * *